United States Patent [19]

Leksell et al.

[11] Patent Number: 4,947,160

[45] Date of Patent: Aug. 7, 1990

[54] MULTIPLEXED THIN FILM ELECTROLUMINESCENT EDGE EMITTER STRUCTURE AND ELECTRONIC DRIVE SYSTEM THEREFOR

[75] Inventors: David Leksell, Oakmont; Juris A. Asars, Murrysville Boro, both of Pa.

[73] Assignee: Westinghouse Electric Corp., Pittsburgh, Pa.

[21] Appl. No.: 408,391

[22] Filed: Sep. 12, 1989

Related U.S. Application Data

[63] Continuation of Ser. No. 343,697, Apr. 24, 1989, Pat. No. 4,899,184.

[51] Int. Cl.$^5$ .............................................. G09G 3/00
[52] U.S. Cl. ...................................................... 340/805
[58] Field of Search .................. 346/154, 155; 340/805

[56] References Cited

U.S. PATENT DOCUMENTS

| | | | |
|---|---|---|---|
| 3,975,661 | 8/1976 | Kanatani et al. | 340/805 X |
| 4,271,417 | 6/1981 | Blumenthal et al. | 346/154 |
| 4,415,403 | 11/1983 | Bakewell | 346/155 X |
| 4,525,729 | 6/1985 | Agulnek et al. | 346/154 |
| 4,706,130 | 11/1987 | Yamakawa | 346/154 X |
| 4,728,972 | 3/1988 | Stephany et al. | 346/154 X |
| 4,733,228 | 3/1988 | Flegal | 340/805 X |
| 4,830,467 | 5/1989 | Inoue et al. | 340/805 X |

Primary Examiner—Donald A. Griffin
Attorney, Agent, or Firm—Joseph C. Spadacene

[57] ABSTRACT

A thin film electroluminescent edge emitter structure operable as an electronically controlled, high resolution light source includes a plurality of TFEL assemblies disposed in array-like fashion on a layer of substrate material. Each TFEL assembly includes a first layer of electrically conductive material, a second layer of electrically conductive material spaced from the first electrically conductive layer and an electrically energizable, light-emitting composite layer interposed therebetween. At least the second electrically conductive layer of each TFEL assembly is segmented to provide a plurality of second electrically conductive elements, and the plurality of second electrically conductive elements in combination with the remaining layers of the assembly form a pixel group including a plurality of individual light-emitting pixels. The portion of the light-emitting, composite layer associated with an individual pixel of a particular pixel group is operable to emit light energy at the light-emitting face of the individual pixel when a first electrical signal is applied to the first electrically conductive layer which is common to the pixel group simultaneously with the application of a second electrical signal to the individual pixel second electrically conductive element.

9 Claims, 6 Drawing Sheets

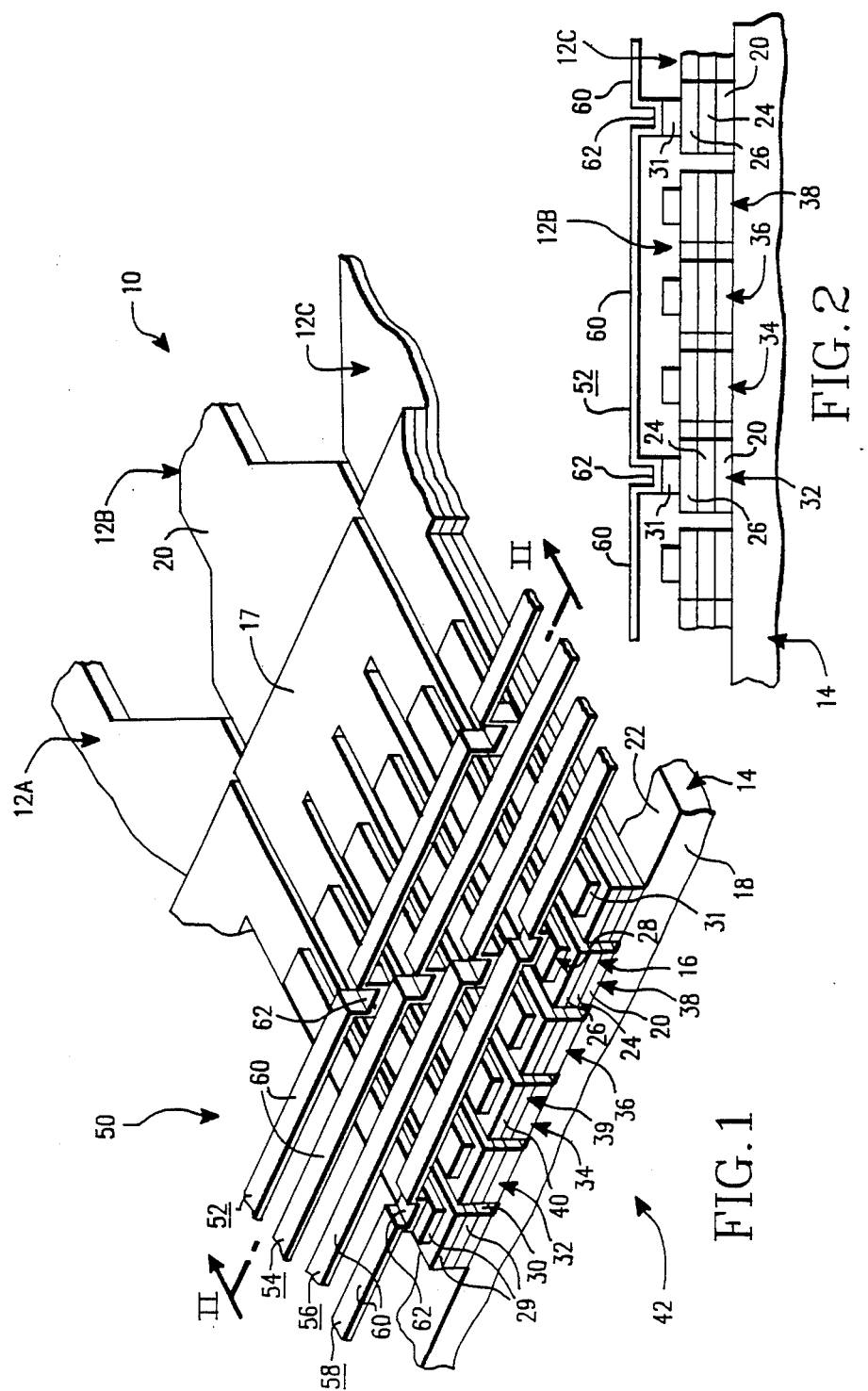

MULTIPLEXED THIN FILM ELECTROLUMINESCENT EDGE EMITTER STRUCTURE AND ELECTRONIC DRIVE SYSTEM THEREFOR

This is a continuation of U.S. patent application Ser. No. 07/343,697, filed Apr. 24, 1989 now U.S. Pat. No. 4,899,184 issued 2/6/90.

BACKGROUND OF THE INVENTION

1. Field of the Invention:

This invention relates generally to a thin film electroluminescent edge emitter structure for use as a high resolution light source, and more particularly, to a thin film electroluminescent edge emitter structure forming an array of light-emitting pixels configured to permit each of the pixels of the array to be energized utilizing multiplexing techniques. This invention further relates to an electronic drive system for use with the edge emitter structure of the present invention.

2. Background Information:

It is well known that an electroluminescent device generally, and particularly a thin film electroluminescent edge emitting device, may be utilized to provide an electronically controlled, high resolution light source. One such device is disclosed in U.S. Pat. No. 4,535,341 to Kuhn et al., which is assigned to the assignee of the present invention. This patent discloses a thin film electroluminescent edge emitter structure which includes a first dielectric layer disposed on a common or bottom electrode, a second dielectric layer spaced from the first dielectric layer, a phosphor layer interposed between the first and second dielectric layers and an excitation or top electrode disposed on the second dielectric layer. At least one of the electrodes, for example, the excitation or top electrode, is segmented to form a plurality of individual control electrodes. The plurality of individual control electrodes in combination with the remaining structure form a plurality of individual light-emitting pixels. In order to facilitate the electrical connection required between each pixel control electrode and the pixel excitation source, the control electrodes are connected to edge pads disposed on the edge emitter structure-supporting substrate via conventional fan-outs.

Another example of a device which utilizes an electroluminescent light-emitting structure as a light source is illustrated in U.S. Pat. No. 4,734,723. This patent discloses an electrophotographic printer which includes an optical head formed from a plurality of electroluminescent devices positioned along one edge of a substrate. A plurality of light waveguide strips are also positioned on the substrate in association with the electroluminescent devices. It is stated that the waveguide strips serve to transmit the light from the electroluminescent devices to the other edge of the substrate which is brought into a face-to-face relationship with the printer photoreceptor. The patent is silent on an electronic drive system for the optical head and the specific connection between the optical head and drive system, other than to state that the lower electrode layers forming portions of the plurality of electroluminescent devices are supplied with electrical signals of varying amplitudes from an optical head drive to cause the associated devices to produce different quantities of light.

Japanese laid-open patent application Kokai No. 63-91998 discloses an EL luminescent edge emitter array operable as a light source in which the upperside metallic electrode wraps around the reflecting end surface of the luminescent layer. Each of the EL elements of the array is surrounded by an insulating film whose refractive index is lower than that of the EL layer. The array further includes a discharge prevention area between the bottom electrode and reflecting end of the top metallic electrode. The laid-open Japanese patent application is also silent on an electronic drive system for the array.

While the prior art discussed above disclose a thin film electroluminescent edge emitter structure for use as a high resolution light source, only the edge emitter structure of Kuhn et al. discloses fully functional means for connecting each of the individual light-emitting pixels of the structure to a pixel excitation source. Recognizing that the physical size of each light-emitting pixel of the structure is extremely small, Kuhn et al. teach the use of a fan-out to connect the control electrode of each pixel to an edge pad spaced a substantial distance from the structure itself. Each of the edge pads is, in turn, connected with the pixel excitation source. Thus, the fan-outs and edge pads provide a signal flow path between the pixel excitation source and the control electrodes of the individual pixels forming the edge emitter structure. Although the fan-outs and edge pads provide a satisfactory means for connecting the excitation source with each of the pixels of the edge emitter structure, forming the fan-outs of the size and length required is a physically complex task and requires a relatively large area for fan-out expansion. As a result, the substrate layer upon which the edge emitter structure, fan-outs, and edge pads are positioned must be physically large to accommodate this fan-out expansion.

Generally, therefore, there is a need for an improved thin film electroluminescent (TFEL) edge emitter structure requiring fewer physical connections between the individual pixels forming the structure and the pixel excitation source than TFEL edge emitter structures heretofore known and utilized. Specifically, the improved TFEL edge emitter structure must be configured to permit the individual pixels of the structure to be selectively energized utilizing multiplexing techniques. Forming a structure wherein each of the pixels of the structure may be selectively multiplexed to an "on" or "energized" state results in an edge emitter structure having a physical size smaller than the combination edge emitter structure/fan-out arrangement of the prior art, and further results in a TFEL edge emitter structure capable of being easily manufactured and readily massproduced. In addition, there is a need for a novel electronic system for driving the multiplexed TFEL edge emitter structure of the present invention to permit the individual pixels of the structure to be selectively energized.

SUMMARY OF THE INVENTION

In accordance with the present invention, there is provided a thin film electroluminescent (TFEL) edge emitter structure for use as a high resolution light source which includes a substrate layer having a plurality of TFEL assemblies disposed in array-like fashion thereon. Each TFEL assembly includes a first layer of electrically conductive material, a second layer of electrically conductive material spaced from the first electrically conductive layer and an electrically energizable, light-emitting composite layer interposed therebetween. At least the second electrically conductive layer of each TFEL assembly is segmented to form a plurality of second electrically conductive elements, and the plurality of second electrically conductive elements in combination with the electrically energizable, light-emitting composite layer and first electrically conductive layer form a pixel group including a plurality of individual pixels.

The light-emitting composite layer of an individual pixel of a particular pixel group is operable to emit light energy at a light-emitting edge surface of said pixel upon the application of a first electrical signal to the first electrically conductive layer which is common to each pixel of the pixel group and a second electrical signal to the individual pixel second electrically conductive element.

Further in accordance with the present invention, there is provided a thin film electroluminescent (TFEL) edge emitter structure for use as a high resolution light source and an electronic drive system therefor which includes a substrate layer having a plurality of TFEL assemblies disposed in array-like fashion thereon. Each TFEL assembly forms a generally laminar arrangement and includes a first layer of electrically conductive material, a second layer of electrically conductive material spaced from the first electrically conductive layer and an electrically energizable, light-emitting composite layer interposed therebetween. At least the second electrically conductive layer of each TFEL assembly is segmented to form a plurality of second electrically conductive elements, and the plurality of second electrically conductive elements in combination with the electrically energizable, light-emitting composite layer and first electrically conductive layer form a pixel group including a plurality of individual light-emitting pixels. The portion of the light-emitting composite layer associated with an individual pixel of a particular pixel group is operable to emit light energy at a light-emitting edge surface of said pixel upon the application of a first electrical signal to the first electrically conductive layer which is common to each pixel of the particular pixel group, and a second electrical signal to the individual pixel second electrically conductive element.

Electrical connecting means is provided and electrically connects the second electrically conductive element of at least one pixel of one of the pixel groups with the second electrically conductive element of at least one pixel of each of the remaining pixels groups. A first electrical source is connected with the first electrically conductive layer of each pixel group, the first electrical source being operable to provide a first electrical signal to selected ones of the pixel groups first electrically conductive layers. A second electrical source is connected with the electrical connecting means and is operable to provide a second electrical signal to the second electrically conductive element of each pixel of each pixel group electrically connected with the electrical connecting means. The application of a first electrical signal to selected ones of the pixel groups first electrically conductive layers is coordinated with the application of a second electrical signal to the second electrically conductive element of each pixel of each pixel group connected with the electrical connecting means so that the simultaneous application of a first and a second electrical signal to an individual pixel first electrically conductive layer and second electrically conductive element causes the portion of the light-emitting composite layer associated with the individual pixel to emit light energy at the individual pixel light-emitting face.

Still further in accordance with the present invention, there is provided a thin film electroluminescent (TFEL) edge emitter structure and electronic drive system therefor which includes a substrate layer having a plurality of TFEL assemblies disposed in array-like fashion thereon. Each TFEL assembly forms a generally laminar arrangement and includes a first layer of electrically conductive material, a second layer of electrically conductive material spaced from the first electrically conductive layer and an electrically energizable, light-emitting composite layer interposed therebetween. At least the second electrically conductive layer of each TFEL assembly is segmented to form a plurality of second electrically conductive elements, and the plurality of second electrically conductive elements in combination with the electrically energizable, light-emitting composite layer and first electrically conductive layer form a pixel group including a plurality of individual light-emitting pixels.

Electrical connecting means is provided and electrically connects the second electrically conductive element of a prepositioned pixel of on of the pixel groups with the second electrically conductive element of a similarly prepositioned pixel of each of the remaining pixel groups. A first electrical source is provided having an input for receiving a plurality of data signals from a signal-generating source, and a plurality of outputs. One output is connected with the first electrically conductive layer of a single pixel group. The first electrical source is operable in response to the received data signals to provide first electrical signals to selected ones of the pixel groups first electrically conductive layers. A second electrical source is connected with the electrical connecting means as is operable to provide a second electrical signal to the second electrically conductive element of each prepositioned pixel of each pixel group.

The portion of the light-emitting, composite layer associated with a prepositioned pixel of a particular pixel group is operable to emit light energy at a light-emitting surface of the prepositional pixel when a first electrical signal is applied to the particular pixel group first electrically conductive layer simultaneously with the application of a second electrical signal to the prepositioned pixel second electrically conductive element and the absolute magnitude of the difference between the first and second electrical signals is a minimum preselected value.

BRIEF DESCRIPTION OF THE DRAWINGS

The above, as well as other features and advantages of the present invention, will become apparent through consideration of the detailed description in connection with the accompanying drawings in which:

FIG. 1 is a perspective view of a portion of the multiplexed thin film electroluminescent (TFEL) edge emitter structure of the present invention;

FIG. 2 is a front elevational view of a portion of the multiplexed TFEL edge emitter structure of the present invention taken along line II—II of FIG. 1;

DESCRIPTION OF THE PREFERRED EMBODIMENTS

Figure 6:
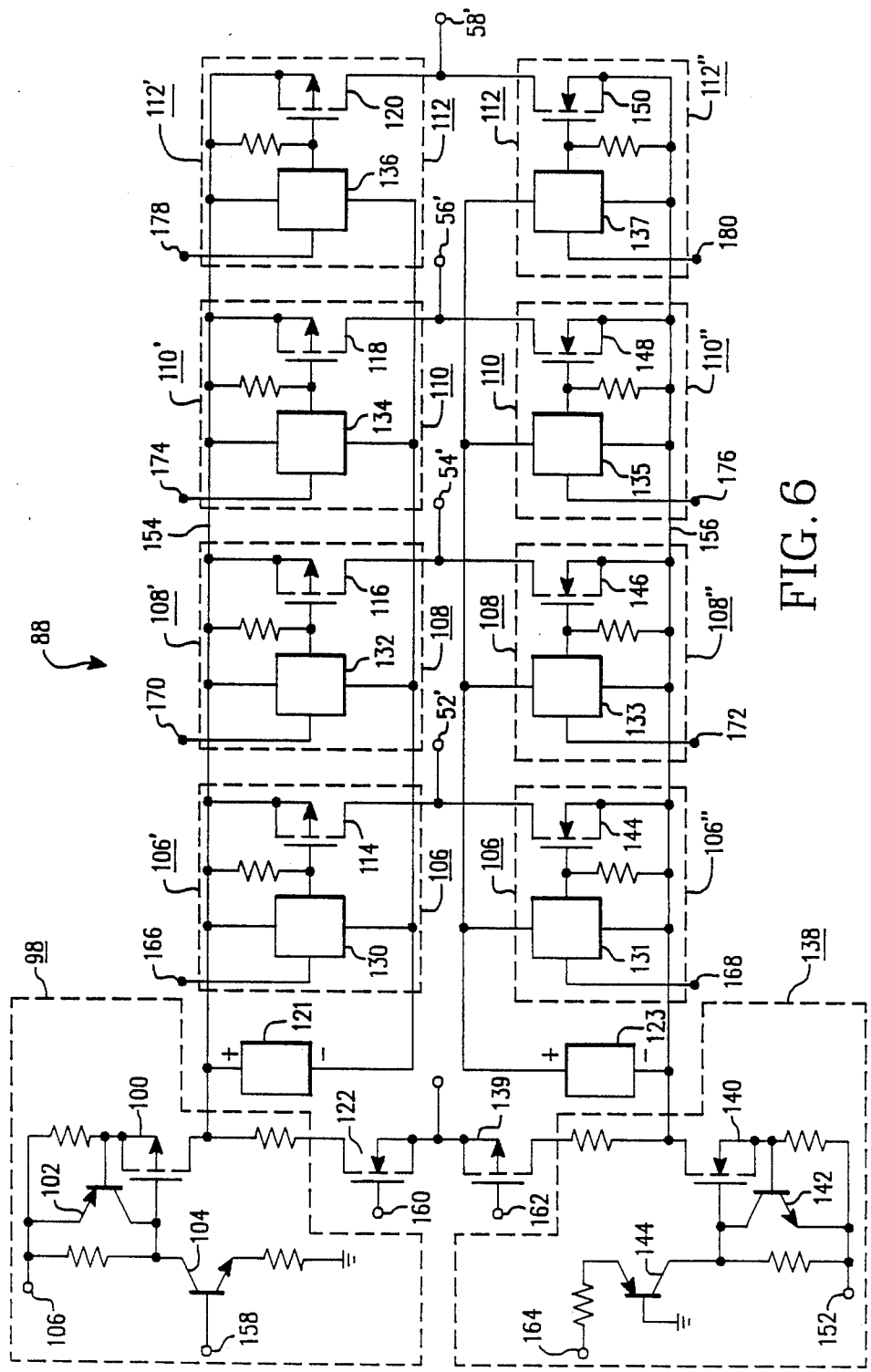
FIG. 6 is a schematic illustration of a portion of the electronic drive circuitry of FIG. 4.

Referring to the drawings, and particularly to FIG. 1, there is illustrated in perspective a portion of a thin film electroluminescent (TFEL) edge emitter structure of the present invention generally designated by the numeral 10 for use as a solid state, electronically controlled high resolution light source. As will be explained herein, TFEL edge emitter structure 10 is configured to form a plurality of light-emitting pixels each capable of being selectively energized utilizing multiplexing techniques to an "on" or light-emitting state. Utilizing multiplexing techniques to selectively energize the pixels of the structure eliminates the need for conventional fan-outs presently utilized in combination with known TFEL edge emitter structures to provide the electrical connection between the structure and the structure's electronic drive.

As seen in FIG. 1, TFEL edge emitter structure 10 includes a plurality of TFEL assemblies 12A, 12B, 12C disposed in array-like fashion on a layer of substrate material 14. As will be explained later in greater detail, each of the TFEL assemblies is arranged to form a pixel group including a plurality of light-emitting pixels. Since the TFEL assemblies 12A, 12B, 12C are identical, the description of the specific configuration of these assemblies will be made only with reference to assembly 12B. However, it should be understood that each of the assemblies of edge emitter structure 10 has the same configuration. In addition, although only TFEL assembly 12B and portions of assemblies 12A and 12C are illustrated in FIG. 1, it should be understood that the actual number of TFEL assemblies forming TFEL edge emitter structure 10 may be varied depending upon the desired overall length of the edge emitter structure.

TFEL assembly 12B has an edge surface 16 substantially aligned with the edge surface 18 of substrate layer 14, and includes a first layer of electrically conductive material 20 disposed on the surface 22 of the substrate layer. A layer of dielectric material 24 is disposed on the first layer of electrically conductive material 20, a layer of phosphor material 26 is disposed on dielectric layer 24 and a second layer of electrically conductive material 28 is disposed on phosphor layer 26. Dielectric layer 24 and phosphor layer 28 described herein are collectively referred to as "an electrically energizable, light-emitting composite layer". Thus, these respective layers are meant to form a light-emitting layer which is only an example of the type of light-emitting layer which may be included in TFEL assembly 12B. It is intended, therefore, that the invention described herein not be limited to the use of a dielectric layer and a phosphor layer to form the light-emitting composite layer. Although not specifically illustrated in FIG. 1, the positioning of dielectric layer 24 and phosphor layer 26 forming the electrically energizable, light-emitting composite layer may be reversed if desired so that phosphor layer 26 is disposed on first electrically conductive layer 20 and dielectric layer 24 is disposed on phosphor layer 26. It should be understood that although dielectric layer 24 is illustrated in FIG. 1 as a unitary layer, the dielectric layer may, in fact, consist of a plurality of sublayers. In addition, the sublayers may be formed from different dielectric materials, and those skilled in the art may select the sublayer material utilized depending upon the dielectric properties desired. It should be further understood that the identifying terms "first" and "second" electrically conductive layers are used herein for the sake of clarity only, and are not intended to represent the positions of these respective layers within the TFEL edge emitter structure.

The layer of dielectric material 24, layer of phosphor material 26 and second layer of electrically conductive material 28 disposed on the first layer of electrically conductive material 20 of TFEL assembly 12B form a laminar stack 29. As illustrated in FIG. 1, laminar stack 29 and first electrically conductive layer 20 of TFEL assembly 12B are segmented or cut to form a plurality of recessed portions or channels 30 which extend inwardly a preselected distance from the edge surface 16 of TFEL assembly 12B toward TFEL assembly 12B rear end portion 17. The plurality of channels 30 formed in laminar stack 29 and first electrically conductive layer 20 divide TFEL assembly 12B into a plurality of individual, parallel pixels 32, 34, 36, 38. Thus, by forming three channels 30 in the laminar stack 29 and first electrically conductive layer 20 of TFEL assembly 12B as illustrated in FIG. 1, four individual pixels 32–38 are formed on the surface 22 of substrate layer 14. As seen herein, the first electrically conductive layer and light-emitting composite layer of TFEL assembly 12B remain common to each of the pixels 32–38 forming TFEL assembly 12B after the segmenting process is complete. Thus, each of the pixels 32–38 is formed from portions of these respective layers. However, the second electrically conductive layer 28 forms, after segmenting, a plurality of spaced apart elements referred to herein as second electrically conductive elements 31. In this manner, one second electrically conductive element 31 forms a portion of one of the pixels 32–38. It should be understood that, if desired, the number of channels 30 formed in TFEL assembly 12B may be either increased or decreased to vary the number of pixels actually formed. In addition, it should be understood that although laminar stack 29 and first electrically conductive layer 20 of assembly 12B are illustrated in FIG. 1 as being segmented to form the plurality of pixels 32–38 for the sake of clarity, only the second layer of electrically conductive material 28 of TFEL assembly 12B is required to be segmented to form the plurality of individual parallel pixels 32–38. If only second electrically conductive layer 28 is segmented, the resulting second electrically conductive elements 31 will also each form portions of the plurality of pixels 32–38.

As described, each of the pixels 32–38 of TFEL assembly 12B disposed on substrate layer 14 surface 22 forms a generally laminar arrangement and includes a portion of first electrically conductive layer 20, portions of the layers of dielectric material 24 and phosphor material 26 forming an electrically energizable, light-emitting composite layer, and a second electrically conductive element 31. Each of the pixels 32–38 has a light-emitting edge surface 39 formed from at least the edge surface 40 of each pixel phosphor layer 26. The plurality of pixels 32–38 of TFEL assembly 12B form a pixel group designated by the numeral 42. As will be described later in greater detail, the plurality of pixels 32–38 of pixel group 42 are selectively operable to emit light energy at their respective light-emitting edge surfaces or faces 39 upon the simultaneous application of a first electrical signal to the first electrically conductive layer 20 associated with or common to the pixel group and a second electrical signal to the pixels 32–38 second electrically conductive elements 31.

Figure 3:
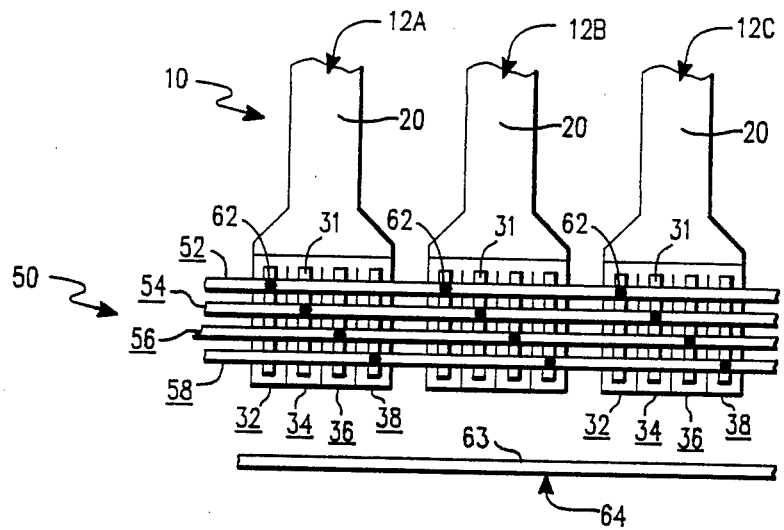
FIG. 3 is a top plan view of a portion of the multiplexed TFEL edge emitter structure of the present invention.

Now referring to FIGS. 1 and 2, TFEL edge emitter structure 10 includes electrical connecting means generally designated by the numeral 50 positioned in overlying relation with the TFEL assemblies 12A, 12B and 12C. Electrical connecting means 50 includes a plurality of bus bars 52, 54, 56, 58, each shaped to include straight portions 60 separated by "U"-shaped bent portions 62. Each of the bus bars 52–58 is positioned in overlying relation with the plurality of TFEL assemblies 12A, 12B, 12C to provide that the U-shaped bent portions 62 of a single bus bar contact the second electrically conductive elements 31 of similarly prepositioned pixels 31 of each of the pixel groups. For example, as seen in FIGS. 1 and 2, the "U"-shaped bent portions 62 of bus bar 52 contact the second electrically conductive elements 31 of the pixels 32 of adjacent TFEL assemblies 12A, 12B and 12C. Although not specifically illustrated in FIGS. 1 and 2, the "U"-shaped bent portions 62 of bus bar 54 contact the second electrically conductive elements of the pixels 34 of adjacent TFEL assemblies 12A, 12B and 12C, the "U"-shaped bent portions 62 of bus bar 56 contact the second electrically conductive elements 31 of the pixels 36 of adjacent TFEL assemblies 12A, 12B and 12C, and the "U"-shaped bent portions 62 of bus bar 58 contact the second electrically conductive elements 31 of the pixels 38 of adjacent TFEL assemblies 12A, 12B and 12C. With this arrangement, the second electrically conductive element of a prepositioned pixel of a single pixel group 42 which forms a single TFEL assembly is electrically connected with the second electrically conductive elements of similarly prepositioned pixels of each of the remaining pixel groups. As will be explained later in greater detail, the second electrically conductive elements 31 of similarly prepositioned pixels of each of the pixel groups are electrically connected with each other via a single bus bar so that the input of an electrical signal to the bus bar also provides simultaneous input of the same electrical signal to each of the similarly prepositioned pixels second electrically conductive elements The relationship between each of the bus bars 52–58 forming electrical connecting means 50 and the plurality of TFEL assemblies 12A, 12B, 12C forming a portion of TFEL edge emitter structure 10 is schematically illustrated in FIG. 3. As seen in FIG. 3, the plurality of bus bars 52–58 are positioned in overlying relationship with the plurality of pixels 32–38 of each of the TFEL assemblies 12A–12C forming a portion of TFEL edge emitter structure 10. The connections between the "U"-shaped bent portions 62 of each of the bus bars 52–58 and each of the pixels second electrically conductive elements are represented schematically in FIG. 3 by black dots. As seen in FIG. 3, the second electrically conductive elements 31 of similarly prepositioned first pixels 32 of the plurality of TFEL assemblies 12A–12C are connected via bus bar 52. Similarly, the second pixels 34 of the plurality of TFEL assemblies are electrically connected via bus bar 54, the third pixels 36 of the plurality of TFEL assemblies are electrically connected via bus bar 56 and the fourth pixels of the plurality of TFEL assemblies are electrically connected via bus bar 58. It is apparent from FIG. 3, for example, that applying an electrical signal to bus bar 52 causes the same electrical signal to be applied to the second electrically conductive elements 31 of the pixels 32 of the TFEL assemblies 12A–12C.

As previously described with respect to FIGS. 1 and 2, each of the pixels 32–38 of each of the TFEL assemblies 12A–12C forming a portion of TFEL edge emitter structure 10 is formed from a portion of first electrically conductive layer 20, a portion of an electrically energizable, light-emitting composite layer formed from portions of dielectric and phosphor layers 24, 26 and a second electrically conductive element 31. The excitation of the portion of the composite layer associated with a particular pixel to cause that portion of the composite layer of the pixel to radiate light energy at the pixel light-emitting face or edge surface is accomplished by the simultaneous application of electrical signals to both the first electrically conductive layer and second electrically conductive element of the pixel. As seen in FIG. 3, by utilizing the novel multiplexed TFEL edge emitter structure 10 of this invention, applying a first electrical signal to the first electrically conductive layer 20 of a particular TFEL assembly 12A, 12B or 12C places the first electrical signal on the portions of the first electrically conductive layer associated with each of the pixels of the pixel group. The simultaneous application of a second electrical signal to one of the bus bars 52–58 will place the second electrical signal on the second electrically conductive elements 31 of each of the similarly prepositioned pixels connected via the bus bar. Thus, providing a first electrical signal to the first electrically conductive layer 20 of, for example, TFEL assembly 12A, necessarily results in the same first electrical signal being applied to each of the pixels 32–38 of assembly 12A since first electrically conductive layer 20 is common to each of these pixels. The simultaneous application of a second electrical signal to, for example, bus bar 52 places the second electrical signal on the second electrically conductive elements 31 of each of the pixels 32 of TFEL structure 10. The application of a first electrical signal to the first electrically conductive layer 20 of each of the pixels 32–38 of TFE assembly 12A simultaneously with the application of a second electrical signal to the second electrically conductive elements of each of the similarly prepositioned pixels 32 of TFEL structure 10 via bus bar 52 causes only the portion of the light-emitting composite layer of TFEL assembly 12A associated with pixel 32 to radiate light energy at the light-emitting edge surface or face 39 of pixel 32 in a direction towards the surface 63 of member 64. (As will be explained later in greater detail, member 64 represented schematically herein may be any type of photosensitive member, such as a sheet of photosensitive paper or an electrophotographic drum forming a portion of an electrophotographic imaging station). If the first electrical signal is maintained on the first electrically conductive layer 20 of TFEL assembly 12A and the second electrical signal is transferred from bus bar 52 to bus bar 54, then the portion of the composite layer associated with pixel 32 will cease to radiate light energy and the portion of the composite layer associated with pixel 34 will radiate light energy in a direction towards the surface 63 of member 64. In similar fashion, successively transferring the second electrical signal from bus bar 54 to bus bars 56 and 58 will cause the associated portions of the composite layers of pixels 36 and 38 to radiate light energy.

As described, placing a first electrical signal on the first electrically conductive layer 20 of each of the TFEL assemblies 12A-12C necessarily results in the first electrical signal being placed on the portion of the first electrically conductive layer associated with each of the pixels 32-38 of each of the TFEL assemblies 12A-12C. If a second electrical signal is successively placed on each of the bus bars 52-58 while the first electrical signal is maintained on each of the TFEL assemblies 12A-12C pixels 32-38 first electrically conductive layers 20, the light-emitting composite layers of the pixels 32-38 of each of the TFEL assemblies will successively emit or radiate light energy. As will be explained later in greater detail, whether an individual pixel of a particular TFEL assembly emits light energy upon the simultaneous application of first and second electrical signals to the first electrically conductive layer and second electrically conductive element of the pixel depends upon the absolute magnitude of the difference in voltage between the first and second electrical signals Now referring to FIG. 4, there is schematically illustrated the TFEL assemblies 12A-12C forming a portion of TFEL edge emitter structure 10 and previously described with respect to FIGS. 1-3. Each of the TFEL assemblies 12A-12C includes four pixels 32-38, and each of the four pixels in turn includes a second electrically conductive element 31 spaced from the first layer of electrically conductive material common to each of the pixels of the pixel group. The first electrically conductive layer and four second electrically conductive elements 31 form the electrically conductive members of each of the pixels 32-38 previously described. The electrically energizable, light-emitting composite layer described herein by way of example as including phosphor and dielectric layers 24, 26 and forming portions of each of the pixels 32-38 of each of the assemblies 12A-12C is not illustrated in FIG. 4. However, it should be understood that an electrically energizable, light-emitting composite layer is interposed between the first electrically conductive layer 20 and the four second electrically conductive elements 31 forming the pixels 32-38 of each individual TFEL assembly pixel group.

Figure 4:
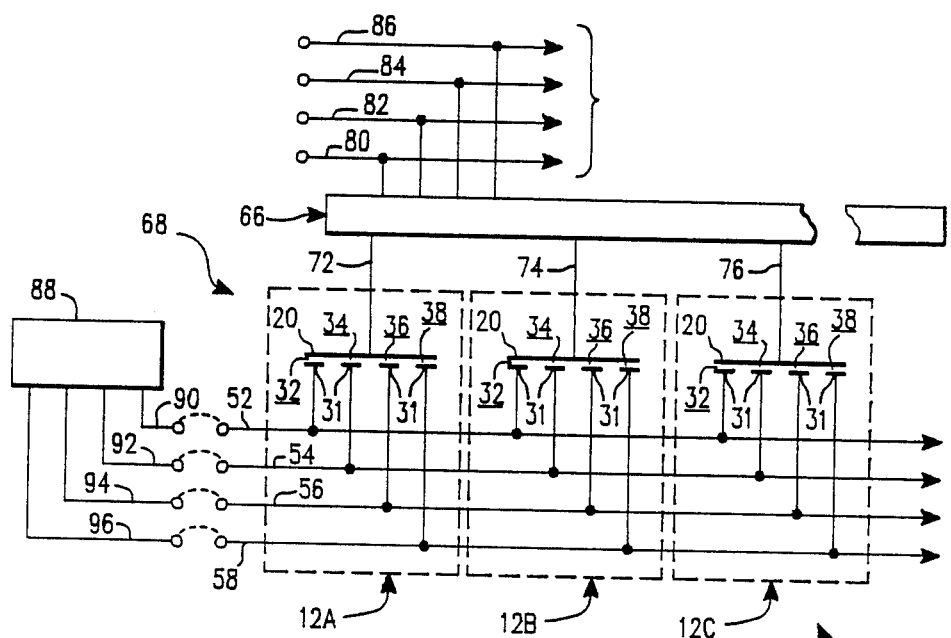
FIG. 4 is a schematic illustration of the multiplexed TFEL edge emitter structure of the present invention and its attendant electronic drive circuitry.

As seen in FIG. 4, the first electrically conductive layer 20 of each TFEL assembly is connected with a first electrical source generally designated by the numeral 66 which forms a portion of a TFEL edge emitter structure electronic drive system generally designated by the numeral 68 and which also is a subject of the present invention. First electrical source 66 is a commercially available combination shift register/latch/driver device having a plurality of outputs 72, 74, 76 connected with the plurality of TFEL assemblies 12A-12C first electrically conductive layers 20. Shift register/latch/driver 66 further includes a plurality of inputs 80-86. Input 80 is a data input, input 82 is a clock input, input 84 is a latch input and input 86 is a polarity input. As known in the art, data input 80 may be connected with an electrical signal-generating source (not shown). Examples of the types of electrical signal-generating sources which may provide a data input to device 66 are the internal controller of a PC or the controller of an electrophotographic-type copier or printer which converts the information to be copied or printed to a series of bits of information.

Data input 80 receives a digital, serial train of data pulses or signals in the form of bits of information from a suitable electrical signal-generating source or controller, and the bits of information are entered into the shift register at each of the shift register memory locations. Since the construction and operation of device 66 is well known in the art, the internal operation of device 66 will not be described in detail herein. As further known in the art, clock input 82 receives clock pulses from the same electrical signal-generating source or controller which supplies the digital bits of information to the shift register on data input 80 in order to allow shift register/latch/driver 66 to determine the rate at which the bits are being received. Latch input 84 latches the various bits entered into the internal latch locations of shift register/latch/driver 66 connected with the outputs 72-76 of device 66 to maintain the various bits in the latch locations as additional bits of information are received from the electrical signal-generating source on data input 80. Polarity input 86 received a serial pulse train operable to invert the outputs of first electrical source 66 every one-half cycle in synchronism with the output signals of a second electrical source 88 which also forms a portion of electronic drive system 68. The construction and operation of second electrical source 88 will be described later herein in greater detail.

As described, shift register/latch/driver 66 is operable to receive a serial train of first electrical signals or digital pulses on data input line 80. The serial pulse train is entered into the shift register, and a single bit of information is stored at each of the shift register latch locations. For example, if shift register/latch/driver 66 is an eighty output device, then a maximum of eighty bits of information or first electrical signals may be stored in the eighty latch locations internal to device 66.

As further seen in FIG. 4, electronic drive system 68 includes a second electrical source generally designated by the numeral 88. The second electrical source 88 includes four outputs 90, 92, 94, and 96 which are connected with the schematically represented bus bars 52, 54, 56, and 58, respectively. Second electrical source 88 is operable to provide a second electrical signal to each of its outputs 90-96 in succession, and this results in the second electrical signal being successively provided to each of the bus bars 52-58. In addition, the operation of second electrical source 88 is repetitive, i.e., after the second electrical signal is successively supplied to each of the outputs 90-96, the signal-supplying process is repeated.

The operation of TFEL edge emitter assembly 10 and electronic drive system 68 is as follows. A series of first electrical signals in the form of bits of information is supplied to shift register/latch/driver 66 from a conventional electrical signal-generating source on data within device 66 to an individual internal latch location. The bit in a single latch location is provided as a shift register/latch/driver output signal to one of the TFEL assemblies first electrically conductive layers (three outputs illustrated at 72-76). Each of the first electrical signals or bits supplied to outputs 72-76 may either be a positive value pulse or a zero value pulse. The first electrical signals or bits supplied to each of the device 66 outputs 72-76 for one operating cycle of device 66 are maintained at the respective TFEL assemblies 12A-12C first electrically conductive layers 20 as second electrical source 88 provides a second electrical signal to each of its outputs 90-96 in succession. Thus, each of the bus bars 52-58 connected with the outputs 90-96 receives, on a sequential basis, the second electrical signal. The second electrical signal is a trilevel signal and may either be a positive value signal, a quiescent value signal or a negative value signal. After the second electrical signal is successively applied to each of the bus bars 52-58, the first electrical signal or bit of information stored at each of the device 66 internal latch locations is replaced with a following first electrical signal or bit of information which had been entered into shift register/latch/driver 66 on data input line 80 during the previous operating cycle of second electrical source 88.

For a single operating cycle of second electrical source 88 to successively transfer the second electrical signal from bus bar 52 through bus bars 54, 56 to bus bar 58, the second electrical signal is successively transferred from the second electrically conductive elements 31 of similarly prepositioned pixels 32 of TFEL assemblies 12A-12C through pixels 34, 36 to the second electrically conductive elements 31 of similarly prepositioned pixels 38. As the second electrical signal is successively transferred to the second electrically conductive layers of the similarly prepositioned pixels 32-38 of each group, a particular pixel will emit light energy if the first electrically conductive layer associated with the particular pixel group also has a first electrical signal applied thereto and the absolute magnitude of the difference between the first and second electrical signals exceeds a preselected value. For example, if a first electrical signal or bit of information is stored in the internal latch location connected with output 72, then that same first electrical signal or bit is present at TFEL assembly 12A first electrically conductive layer 20. If the first electrical signal or bit is maintained on the first electrically conductive layer 20 of TFEL assembly 12A as second electrical source 88 provides a second electrical signal to each of the bus bars 52-58 in succession, the pixels 32-38 of TFEL assembly 12A will emit light energy in succession depending upon the absolute magnitude of the difference between the first and second electrical signals.

Figure 5:
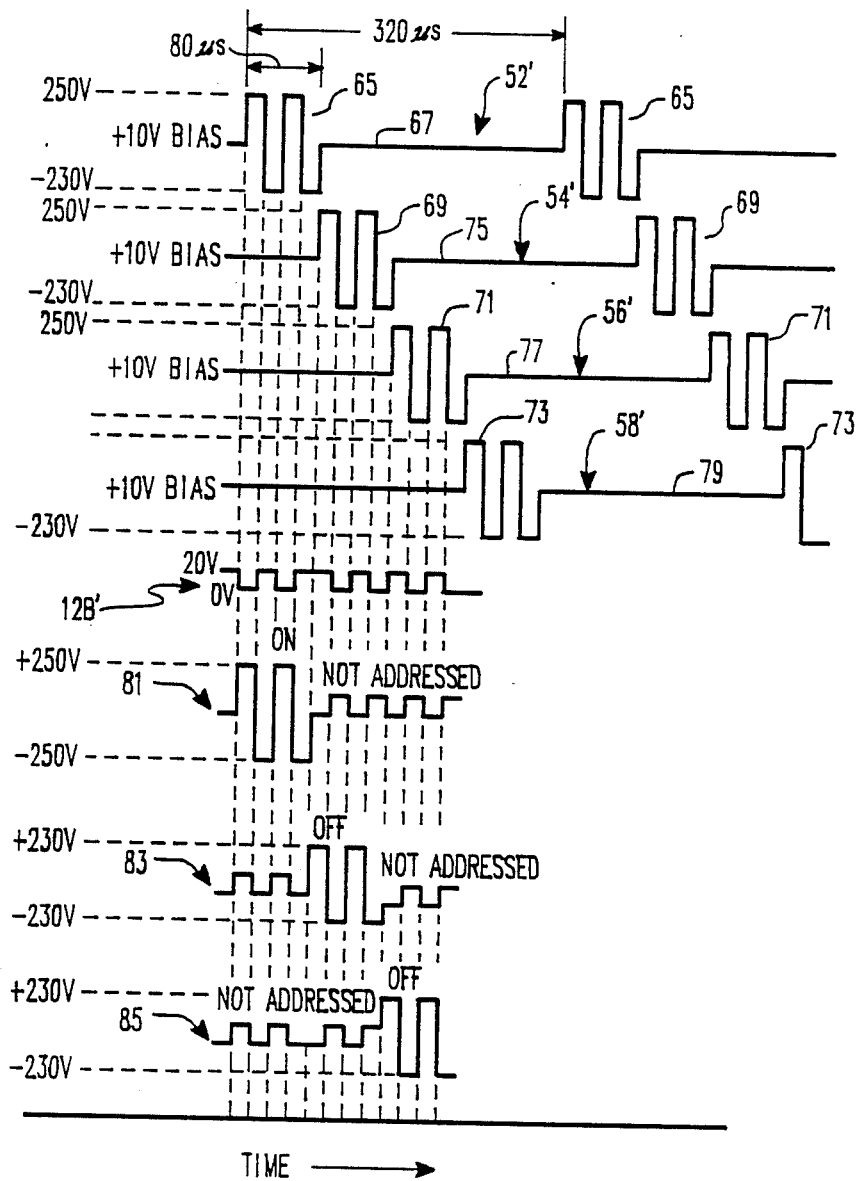
FIG. 5 illustrates the types of signals applied to the first electrically conductive layer and second electrically conductive element of each pixel of the TFEL edge emitter structure of the present invention during operation of the TFEL edge emitter structure.

Referring now to FIG. 5, there is presented a graphic illustration of the types of signals which are applied to the first and second electrically conductive layers of each of the pixels 32-38 of TFEL assemblies 12A-12C by electronic drive system 68. Although the discussion relating to FIG. 5 will describe the types of signals generated by first and second sources 66, 88 and applied to TFEL assembly 12B of FIGS. 3 and 4, it should be understood that these same types of signals are applied to each of the TFEL assemblies forming structure 10.

The four individual signals designated by the numerals 52'-58' correspond to the signals successively placed on the four bus bars 52-58 by second electrical source 88, and each is referred to as a second electrical signal. As seen in FIG. 5, second electrical signal 52' consists of a pair of trilevel signals 65 each having a pulse duration of approximately 80 μs and separated by a +10 V quiescent bias level 67. Similarly, each of the second electrical signals 54', 56', 58' consists of pairs of trilevel pulses 69, 71, 73 separated by +10 V quiescent bias levels 75, 77, 79. It is apparent that second electrical source 88 generates successive groups of electrical pulses such that a single trilevel signal is present at any instant of time on one of the bus bars 52-58.

Further illustrated in FIG. 5 is a pulse train 12B' representative of the type of digital, serial pulse train stored over time at the internal latch location of shift register/latch/driver 66 connected with output 74 and applied to the first electrically conductive layer 20 of TFEL assembly 12B.

The composite signal 81 is a time representation of the sum of first electrical signal 12B' and one trilevel pulse 65, and represents the overall voltage placed on first electrically conductive layer 20 and second electrically conductive element 31 of pixel 32 of TFEL assembly 12B. When composite signal 81 lies between, for example, approximately minus 250 volts and 250 volts, the absolute magnitude of the difference between the positive and negative peaks of the signal equals 500 volts. At a voltage of this approximate absolute magnitude the portion of the electrically energizable, light-emitting composite layer associated with assembly 12B pixel 32 radiates light energy. When composite signal 81 has an absolute magnitude of less than approximately 460 volts, the light-emitting, composite layer of assembly 12 pixel 32 does not radiate light energy, and the pixel is "off" or not addressed. A comparison of composite signals 81, 83 (sum of one trilevel pulse 69 and first electrical signal 12B') and 85 (sum of one trilevel pulse 71 and first electrical signal 12B') illustrates that when pixel 32 of TFEL assembly 12B is energized or "on", the pixels 34 and 36 of the same assembly are de-energized or not addressed. Although not specifically illustrated in FIG. 5, pixel 38 of the same assembly will not be addressed when pixel 32 is "on".

During operation of electronic drive system 68, each of the bits of information forming first electrical signal 12B' are stored in succession in the internal latch location connected with output 74 of shift register/latch/driver 66. This, in turn, successively places each of the bits on the first electrically conductive layer 20 of TFEL assembly 12B. As each of the first bits forming signal 12B' are successively provided to assembly 12B first electrically conductive layer 20, the second electrical signals 52'-58' are provided to the bus bars 52-58. When the absolute magnitude of the difference between the first and second electrical signals on the first electrically conductive layer and second electrically conductive element 31 of TFEL assembly 12B pixel 32 is greater than approximately 460 volts, the pixel 32 of TFEL assembly 12B is energized and emits light energy.

Now referring to FIG. 6, there is illustrated a detailed schematic of second electrical source 88 illustrated in FIG. 5 and utilized to generate the plurality of second electrical signals 52'-58'. Second electrical source 88 includes a positive current source 98 composed of a P-channel MOSFET transistor 100, a current limiter in the form of transistor 102 and a level translator in the form of transistor 104. The MOSFET transistor 100, current limiter 102, and level translator 104 are utilized to shape the positive portions of the second electrical signals 52'-58'. The amplitude of the positive portions of the second electrical signals 52'-58' is determined by a highly regulated direct potential level "positive amplitude" input 106. The current generated by positive current source 98 is directed to the positive portions 106', 108', 110', 112' of one of the selected channels 106, 108, 110 or 112 by one of the P-channel MOSFET steering transistors 114–120. The positive channel portions 106', 108', 110' or 112' are selected by operation of one of the optocouplers 130, 132, 134 or 136, which are operable to activate one of the steering transistors 114–120. A floating power source schematically illustrated and generally designated by the numeral 121 supplies the required operating voltage to each of the optocouplers 130–136. The positive portion of each of the waveforms 52'–58' is terminated by discharging the capacitance of each of the pixels through N-channel MOSFET transistor 122 to a quiescent "bias" potential.

In a similar manner the negative portions of the second electrical signals 52'–58' are generated by a negative current source 138 which includes an N-channel MOSFET transistor 140, a current limiter in the form of transistor 142, and a level translator in the form of transistor 144. The negative portions of the second electrical signals 52'–58' are directed to the negative portions 106", 108", 110", 112" of selected output channels 106–112 by one of the steering transistors 144, 146, 148, and 150. The negative channel portions 106", 108", 110" or 112" are selected by operation of one of the optocouplers 131, 133, 135 or 137, Which are operable to activate one of the steering transistors 144–150. A floating power source schematically illustrated and generally designated by the numeral 123 supplies the required operating voltage to each of the optocouplers 131–137. The amplitude of the negative portions of the second electrical signals 52'–58' are determined by the "negative amplitude" direct potential level input 152 to negative current source 138, and the negative portion of each of the waveforms 52'–58' is terminated by discharging the capacitance of each of the pixels through a P-channel MOSFET transistor 139 to a quiescent "bias" potential. It should be pointed out that although optocouplers are illustrated in FIG. 6, they may be replaced with level shifters, if desired, to achieve similar results.

Figure 7:
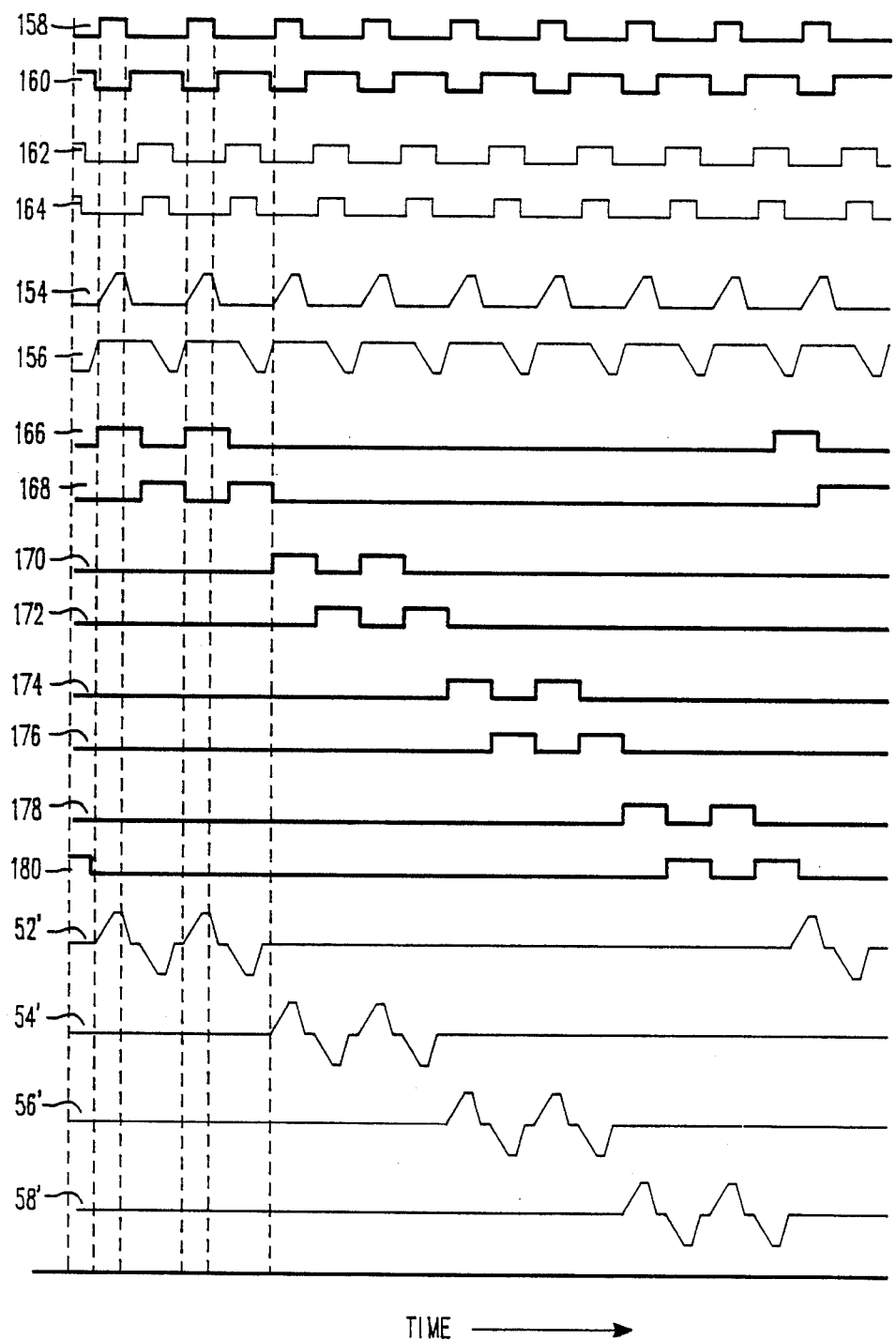
FIG. 7 is a graphic plot of the signals present at preselected points in the circuit illustrated in FIG. 6.

As previously described, each of the pixels 32–38 of each TFEL assembly forming structure 10 requires an energizing or addressing voltage having a peak-to-peak amplitude of at least approximately 460 volts. However, second electrical source 88 is designed so that the maximum potential across any of the transistors is limited to 250 volts. This is achieved by combining the positive and negative-going pulses generated by the positive and negative portions of the channels 106–112 at the output terminals 52'–58', and by providing that lines 154 and 156 are returned to a quiescent bias level at all times between positive and negative pulses, respectively. For the sake of clarity, the output terminals of second electrical source 88 are identified with the same numerals as the waveforms present at these terminals. The unique characteristics of second electrical source 88 allow the builder to utilize conventional, off-the-shelf electronic components. Graphic illustrations of the various electrical signals present at various points within second electrical source 88 illustrated in FIG. 6 are shown in FIG. 7.

Figure 8:
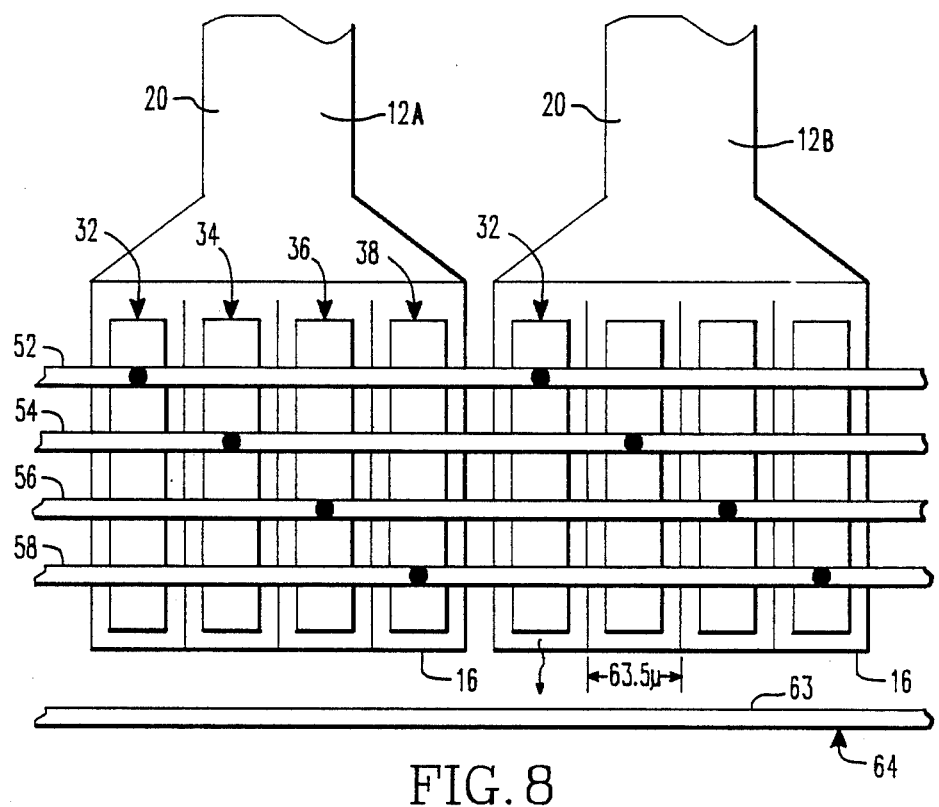
FIG. 8 is an enlarged, top plan view of a portion of the TFEL edge emitter structure illustrated in FIG. 3.

Now referring to FIG. 8, there is illustrated the pair of TFEL assemblies 12A and 12B previously described with reference to FIGS. 1–3. TFEL assemblies 12A and 12B are spaced a preselected distance from the surface 63 of member 64. As previously described, member 64 may be a photosensitive member, such as a sheet of photosensitive material, or a photoreceptor, such as a photoreceptor coated on a rotating drum and utilized in conventional copying machines or printers. If, for example, it is desired to form an image of the letter "T" illustrated in FIG. 9 on the surface 63 of member 64 utilizing TFEL edge emitter structure 10, and it is further desired that the overall width W of the letter "T" is five pixels wide, then the TFEL assemblies 12A and 12B are generally operated as follows.

As photosensitive member 64 is moved relative to TFEL assemblies 12A and 12B, the four pixels 32–38 of TFEL assembly 12A and the pixel 32 of TFEL assembly 12B are selectively energized to transmit light energy onto the surface 63 of photosensitive member 64. If each pixel has an overall width of, for example, 63.5 microns, the width of the beam of light energy projected by each pixel is 63.5 microns. If the surface 63 of photosensitive member 64 is positioned closely adjacent to the edge surfaces 16 of the pair of TFEL assemblies, beam spread will be negligible. If the surface 63 of photosensitive member 64 is spaced from the edge surfaces 16 of the pair of TFEL assemblies, then a focusing system may be interposed between member 64 and the pair of TFEL assemblies 12A, 12B. As photosensitive member 64 is initially moved relative to the TFEL assemblies 12A and 12B, the appropriate first and second electrical signals delivered from first and second electrical sources 66, 88 are respectively provided to the first electrically conductive layers 20 of the pair of TFEL assemblies and the bus bars 52–58 in succession to cause the pixels 32–38 of assembly 12A and the pixel 32 of assembly 12B to project light energy appropriate to form an image schematically illustrated at row 182 on the surface 63 of photosensitive member 64. As photosensitive member 64 is continuously moved relative to the TFEL assemblies 12A and 12B, pixel 36 of TFEL assembly 12A continues to emit light energy appropriate to form an image schematically illustrated at column 184 on the surface 63. If member 64 is a photosensitive member such as a sheet of photosensitive paper, then the exposure of the sheet to the image column and row forming the letter "T" will result in a "T" being formed through development of the paper. If member 64 is a photoreceptor utilized in an electrophotographic-type imaging station, then the column and row forming the image of the letter "T" projected onto the surface of the photoreceptor will discharge the photoreceptor and allow the photoreceptor to accept a suitable toner material so that the letter "T" may thereafter be printed on a sheet of paper.

Figures 9, 10:
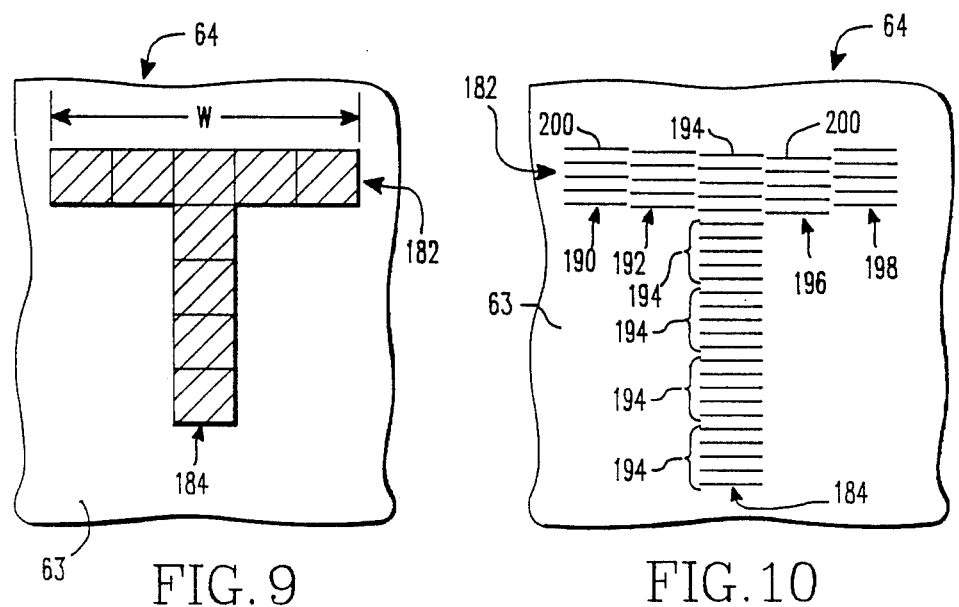
FIG. 9, which is a schematic illustration of the letter "T", is an example of the type of image which may be formed on a photosensitive material or photoreceptor utilizing the TFEL edge emitter structure of the present invention.
FIG. 10 is a schematic illustration of the latent image formed on a photosensitive material or photoreceptor by the TFEL edge emitter structure of the present invention in order to form the image of the letter "T" as illustrated in FIG. 9.

Now referring to FIG. 10, there is illustrated the latent image formed by operation of TFEL assemblies 12A and 12B on the surface 63 of photosensitive member 64 in order to produce the letter "T" of FIG. 9. As seen in FIG. 10, row 182 forming the horizontal bridge of the letter "T" includes five sections 190–198, each section being formed from, for example, five linear segments 200. The five linear segments 200 of section 190 are projected onto the surface 63 of member 64 by operation of TFEL assembly 12A pixel 32. Similarly, the five linear segments 200 of sections 192, 194, 196 and 198 are projected onto the surface 63 of member 64 by operation of TFEL assembly 12A pixels 34, 36, 38 and TFEL assembly 12B pixel 32. As seen in FIG. 10, the row 182 forming the horizontal bridge of the letter "T" is actually nonlinear. This is due to the fact that, as previously described, the second electrical signals 52'–58' are supplied in sequence to the bus bars 52–58 from second electrical source 88. As a result, all of the pixels 32-38 of TFEL assembly 12A do not emit light simultaneously. However, the similarly prepositioned pixels 32 of TFEL assemblies 12A and 12B will emit light energy simultaneously since each of these pixels is connected with bus bar 52 and receives the same second electrical signal 52' (assuming that the first electrically conductive layers 20 of TFEL assemblies 12A and 12B also receive an appropriate first electrical signal at the same time that similarly prepositioned pixels 32 receive second electrical signal 52'). Thus, it can be seen in FIG. 10 that the sections 190 and 198 are horizontally aligned with each other and the sections 192, 194, 196 are distance shifted relative to sections 190, 198. The spacing between each of the segments 200 of each of the sections 190-198 is due to the fact that member 64 is continuously moved past the TFEL assemblies as they are selectively operated to project light energy onto surface 63. As member 64 is continuously moved past the TFEL assemblies 12A and 12B, pixel 36 Of TFEL assembly 12A is operated to project light energy onto surface 63 to form column 184 which forms the vertical section of the "T".

It should be understood that although each of the TFEL assemblies forming TFEL edge emitter structure 10 illustrated in FIGS. 1-3 and FIG. 8 includes four individual light-emitting pixels per TFEL assembly, this is only illustrative of the number of pixels which may be formed in each TFEL assembly. Any number of pixels may be formed in each TFEL assembly of edge emitter structure 10, and the actual number of pixels formed will be selected to achieve a desired resolution. It should be further understood that the number of individual bus bars used to connect similarly prepositioned pixels of each TFEL assembly should coincide with the number of pixels formed in each assembly. Thus, if each TFEL assembly includes eight pixels, then eight individual bus bars will be used. If the number of pixels per TFEL assembly is increased, resulting in a required increase in the number of bus bars utilized, then the second electrical source 88 must be modified to include an individual output for each bus bar.

Although the present invention has been described in terms of what are at present believed to be its preferred embodiments, it will be apparent to those skilled in art that various changes may be made without departing from the scope of the invention. It is therefore intended that the appended claims cover such changes.

We claim:

1. A second electrical source operable to generate a plurality of second electrical signals, each said second electrical signal including a positive signal portion and a negative signal portion, said second electrical source being operable to provide said plurality of second electrical signals to a thin film electroluminescent (TFEL) edge emitter structure connecting means, comprising:

positive current source means for receiving a positive amplitude input signal and shaping said positive amplitude input signal to form a positive signal portion;

negative current source means for receiving a negative amplitude input signal and shaping said negative amplitude input signal to form a negative signal portion;

a plurality of parallel channels each including a positive channel portion and a negative channel portion;

said positive current source being connected with said plurality of parallel channel positive channel portions and said negative current source being connected with said plurality of parallel channel negative channel portions;

each of said plurality of parallel channel positive channel portions being operable to receive said positive signal portion at an input thereto and each of said plurality of parallel channel negative channel portions being operable to receive said negative signal portion at an input thereto;

means for causing the positive signal portion present at a particular channel positive channel portion to be outputted therefrom and thereafter causing the negative signal portion present at said individual channel negative channel portion to be outputted therefrom; and means for combining said positive and negative signal portions outputted from said particular channel positive and negative channel portions to form an individual second electrical signal.

2. The second electrical source of claim 1, wherein:

said positive signal portion has a magnitude determined by the magnitude of said positive amplitude input signal provided to said positive current source; and said negative signal portion has a magnitude determined by the magnitude of said negative amplitude input signal provided to said negative current source.

3. The second electrical source of claim 1, wherein:

said positive signal portion stored in said particular channel positive channel portion has a maximum amplitude of approximately two hundred and fifty (250) volts;

said negative signal portion stored in said particular channel negative channel portion has a maximum amplitude of approximately negative two hundred and fifth ($-250$) volts; and said individual second electrical signal formed by combining said positive and negative signal portions outputted from said particular channel positive and negative channel portions has a maximum absolute magnitude of approximately five hundred (500) volts.

4. The second electrical source of claim 1, wherein:

said positive current source means includes a current limiter in the form of a transistor having base, collector and emitter terminals;

a level translator in the form of a transistor having base, collector and emitter terminals;

said current limiter and level translator transistors being connected with each other at their respective collector terminals;

a P-channel MOSFET transistor having gate, drain and source terminals, said P-channel MOSFET transistor gate terminal being connected with said current limiter and level translator transistors collector terminals; and said positive amplitude input signal is provided to said positive current source means at said current limiter transistor emitter terminal.

5. The second electrical source of claim 1, wherein:

said negative current source means includes a current limiter in the form of a transistor having base, collector and emitter terminals;

a level translator in the form of a transistor having base, collector and emitter terminals;

said current limiter and level translator transistors being connected with each other at their respective collector terminals;

an N-channel MOSFET transistor having gate, drain and source terminals, said N-channel MOSFET transistor gate terminal being connected with said current limiter and level translator transistors collector terminals; and said negative amplitude input signal is provided to said negative current source means at said current limiter transistor element terminal.

6. The second electrical source of claim 1, wherein each of said plurality of channel positive channel portions includes a steering device in the form of a P-channel MOSFET transistor and associated selecting means operatively connected therewith for activating said P-channel MOSFET transistor;

said P-channel MOSFET transistor of a particular channel positive channel portion being operable upon activation by said associated selecting means to output said positive signal portion present at said input thereto;

each of said plurality of channel negative channel portions includes a steering device in the form of an N-channel MOSFET transistor and associated selecting means operatively connected therewith for activating said N-channel MOSFET transistor;

said N-channel MOSFET transistor of a particular channel negative channel portion being operable upon activation by said associated selecting means to output said negative signal portion present at said input thereto; and said positive and negative signal portions outputted from said particular channel positive and negative channel portions are combined at an output terminal common to said particular channel positive and negative channel portions to form said individual trilevel second electrical signal.

7. The second electrical source of claim 6, wherein said selecting means is an optocoupler.

8. The second electrical source of claim 6, wherein said selecting means is a level shifter.

9. The second electrical source of claim 6, wherein: said positive and negative channel portions are connected with floating power sources operable to provide a preselected operating voltage to each of said positive and negative channel portion selecting means.

* * * * *